United States Patent [19]

Acampora

[11] Patent Number: 5,697,066
[45] Date of Patent: Dec. 9, 1997

[54] MEDIA ACCESS PROTOCOL FOR PACKET ACCESS WITHIN A RADIO CELL

[75] Inventor: Anthony Acampora, LaJolla, Calif.

[73] Assignee: The Trustees of Columbia University, New York, N.Y.

[21] Appl. No.: 612,310

[22] Filed: Mar. 7, 1996

[51] Int. Cl.⁶ .................................................. H04B 7/26
[52] U.S. Cl. ......................... 455/54.1; 455/25; 455/33.3; 370/346
[58] Field of Search ................... 455/33.3, 32.1, 455/25, 53.1, 56.1, 54.1, 101, 133, 134, 272, 52.1, 52.3; 379/59, 60; 370/329, 336, 337, 345, 346, 334; 375/200

[56] References Cited

U.S. PATENT DOCUMENTS

| 4,797,947 | 1/1989 | Labedz | 455/33.3 |
|---|---|---|---|
| 5,097,484 | 3/1992 | Akaiwa | 375/267 |
| 5,297,144 | 3/1994 | Gilbert et al. | 370/346 |
| 5,559,866 | 9/1996 | O'Neill | 379/60 |

FOREIGN PATENT DOCUMENTS 157835  3/1989  Japan .

OTHER PUBLICATIONS

Performance Of A Modified Polling Strategy For Broadband Wireless LANS In A Harsh Fading Environment, Zhensheng Zhang and Anthony Acampora, Telecommunications Systems 1(1993) 279–294.

Primary Examiner—Reinhard J. Eisenzopf
Assistant Examiner—Lee Nguyen
Attorney, Agent, or Firm—Brumbaugh, Graves, Donohue & Raymond

[57] ABSTRACT

A method for packet signalling between a base station with a variable antenna system and remote stations uses pilot tones sent by the remote stations to the base station at the start of each data transfer period in which signalling will occur in either direction. The base station uses the pilot tone to configure the directional antenna for communication with the remote station during that data transfer period. The pilot tone signals are initiated by polling signals and polling acknowledgment signals.

11 Claims, 2 Drawing Sheets

MEDIA ACCESS PROTOCOL FOR PACKET ACCESS WITHIN A RADIO CELL

BACKGROUND OF THE INVENTION

The present invention relates to radio communications, and more particularly to radio communications methods in a cellular or similar system between a base station transmitter/receiver and a plurality of remote stations, in particular mobile stations.

In such communications systems it is desirable to use directional antenna systems to increase the signal-to-noise ratio of the communications link and reduce interference. In addition to providing better communications links in a clean environment, the use of directional antennas can provide resistance to multipath fading.

A problem associated with directional antenna systems in a cellular system environment accommodating mobile units is that the transmission environment can be rapidly changing between sequential packet transmissions. Selection of the appropriate antenna configuration by the base station must accordingly be adaptive to the signal, as received from the mobile user during a time interval closely corresponding to the transmission period. Such adaption requires a radio signal from the remote station to the base station on the basis of which an antenna configuration can be selected.

It is therefore an object of the present invention to provide an improved method of signalling between a base station with a directional-beam antenna system and a plurality of remote units which provides for pilot signals from the remote units for purposes of rapid adaptive antenna configuration to abate multipath and reduce noise and interference in a possibly rapidly-changing multipath environment.

SUMMARY OF THE INVENTION

In accordance with the present invention there is provided a method of signalling from a base station to at least one remote station where the base station includes an antenna system providing variable antenna patterns, including a broadbeam pattern. According to the method of the invention there are provided sequential time intervals, each interval including a data transfer segment. The data transfer segment has a selected number of forward polling periods and a number of data transfer periods. At least one polling signal is transmitted from the base station using the broadbeam antenna pattern during a forward polling period corresponding to the remote station, to signal to the remote station that a data transfer to the remote station will be transmitted and to designate the data transfer period in which the data transfer will occur. A pilot tone signal is transmitted from the remote station to the base station during an initial pilot tone portion of the designated transfer period and received at the base station where it is used for selecting a variable antenna pattern. Data signals are transmitted from the base station using the selected antenna pattern during the remaining portions of the data transfer period and received at the remote station.

In accordance with the invention there is also provided a method for signalling from a remote station to a base station having an antenna system providing variable antenna patterns, including a broadbeam pattern. Sequential time intervals are provided, each including a data transfer segment, the data transfer segment has a selected number of reverse polling periods and a number of data transfer periods. A polling signal is transmitted from the remote station during a reverse polling period corresponding to the remote station to signal to the base station that the remote station requests data transfer. An acknowledgment signal is transmitted from the base station and received at the remote station, the ackknowledgment signal designating a data transfer period. A pilot tone signal is transmitted from the remote station during an initial pilot tone portion of the designated data transfer period and data signals are transmitted from the remote station during the remaining portions of the designated data transfer period. The base station receives the pilot tone signal signal and selects a variable antenna pattern using the pilot tone and receives the data signal using the selected antenna pattern.

In accordance with the invention signalling can be provided in both directions between a base station and a plurality of remote stations by providing both forward and reverse polling periods and signals during the data transfer segment. Preferably the polling signals are spread spectrum signals. In one arrangement the acknowledgment signal is transmitted during the reverse polling period. In another embodiment the ackndowledgment signal is transmitted during a forward polling period that occurs after the corresponding reverse polling period.

DESCRIPTION OF THE PREFERRED EMBODIMENT

Figure 1:
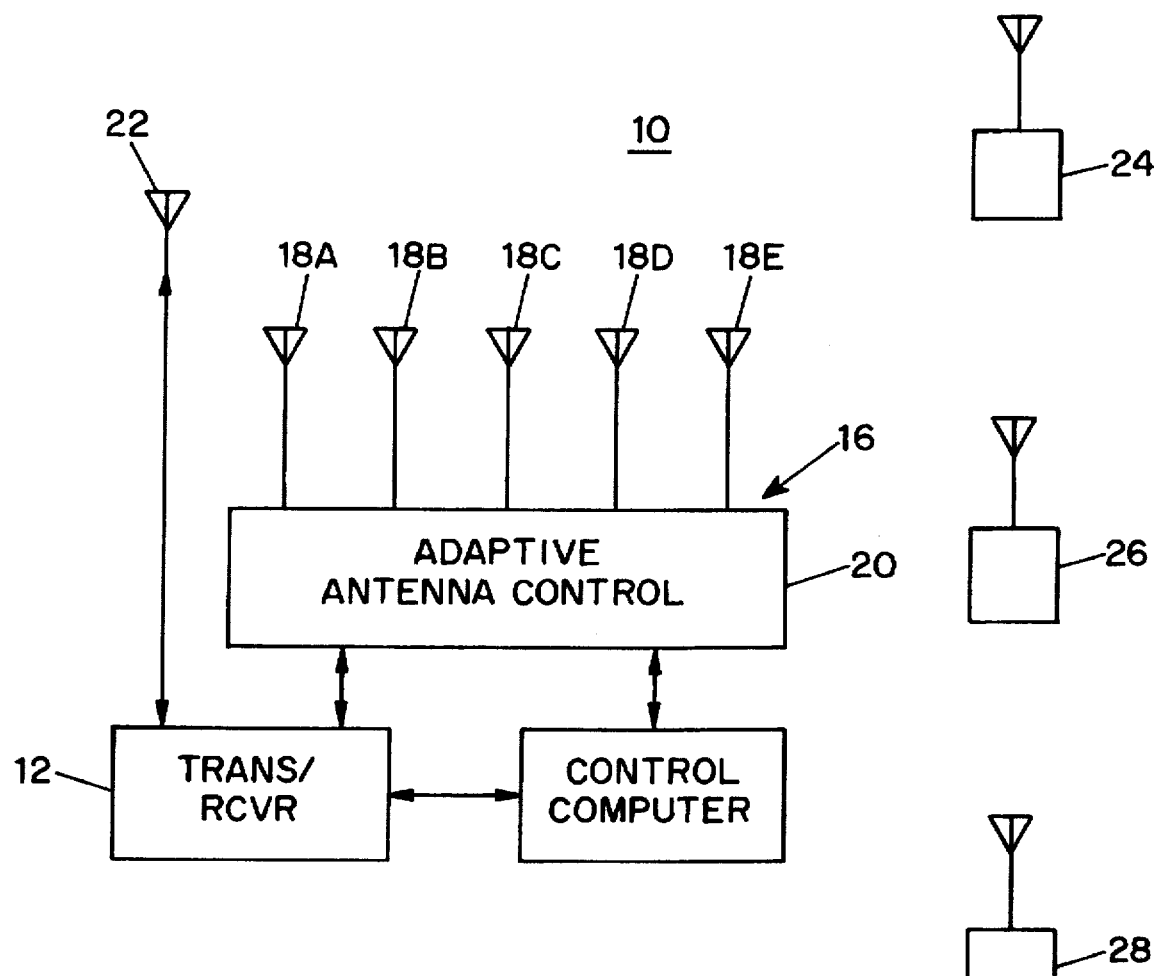
FIG. 1 is a diagram of a communication system using a directional antenna system at the base station.

Referring to FIG. 1 there is generally shown a cellular communications system 10 having a base station including a transmitter/receiver 12 and an adaptive directional antenna system 16. The antenna system 16 of the system 10 includes an array of antenna elements 18 and an adaptive combiner 20 for combining the output signals of the individual antenna elements 18A, 18B, 18C, 18D and 18E in phase and with signal weighting to optimally combine the signals to be provided to the transmitter/receiver 12. Such combining may for example be maximum ratio combining. System 10 also includes a plurality of remote, possibly mobile stations 24, 26, 28 for conducting bi-directional packet communications with the base station.

When a signal is received from one of the remote transmitters 24, 26, 28, the adaptive signal combiner 20 responds to the amplitude and phase of the signals as received at each of the antenna elements 18 and combines the signals in a manner that effectively provides a directional signal pattern that optimally enhances the signal link from the remote station to the central station, including compensation for multipath conditions that might exist.

Antenna system 16 can also provide an omnidirectional or broad-beam azimuth antenna beam form antenna element 22 that is directed at all the remote stations. The broad beam can be provided by signalling with a single one of the elements 18. Alternately a single, separate broadbeam antenna 22 may be provided as part of antenna system 16.

The present invention relates to the provision of a signal protocol which will enable the base station antenna system 16 to transmit and receive certain signals, such as overhead control signals and polling signals, with a broadbeam or omnidirectional antenna pattern and to transmit and receive data signals with an effective directional antenna pattern, which provides the most favorable radio link to a particular remote station which is sending or receiving the data signal.

Adaptive selection of the most favorable effective antenna pattern, particularly for moveable remote stations and a multipath environment, as in a cellular system, is best done at the particular time of a data communication, because movement of the remote station can result in the remote station moving between a favorable and an unfavorable location between subsequent data transmissions. Overhead signalling and polling signals, on the other hand are best transmitted and received over a broadbeam pattern, for example, from omnidirectional antenna 22, so that there is the most likelihood that a remote station at an unknown and changing location will successfully communicate with the base station. In order to protect such signals from the possibility of interference, spread spectrum signal format can be used.

In order to provide rapid adaption to the optimum antenna configuration for a particular packet data communication, in accordance with the present invention, each data transmission, whether from the base station or from a remote station, is initiated with a pilot tone transmission from the remote station to the base station. The pilot tone transmission is initiated in response to spread spectrum forward polling signals from the base station to the remote station, in the case of a base station data transmission, or a spread spectrum reverse polling signal from the remote station and acknowledgement by the base station, in the case of a remote station data transmission.

FIG. 2 is a set of transmission time diagrams illustrating the transmission sequences in the case of a preferred embodiment of the present invention. FIG. 2A shows the overall division of time into a sequence of contiguous time interval frames, preferrably of equal duration. Each time interval frame includes a signalling segment, for transmission and reception of system overhead signals, such as cellular overhead, and a data transfer segment. Three complete sequential time interval frames are illustrated in FIG. 2A. For purposes of system timing control, each signalling segment starts with a frame marker signal from the base station to synchronize all remote units to the timing sequence of the base station.

Figure 2A:
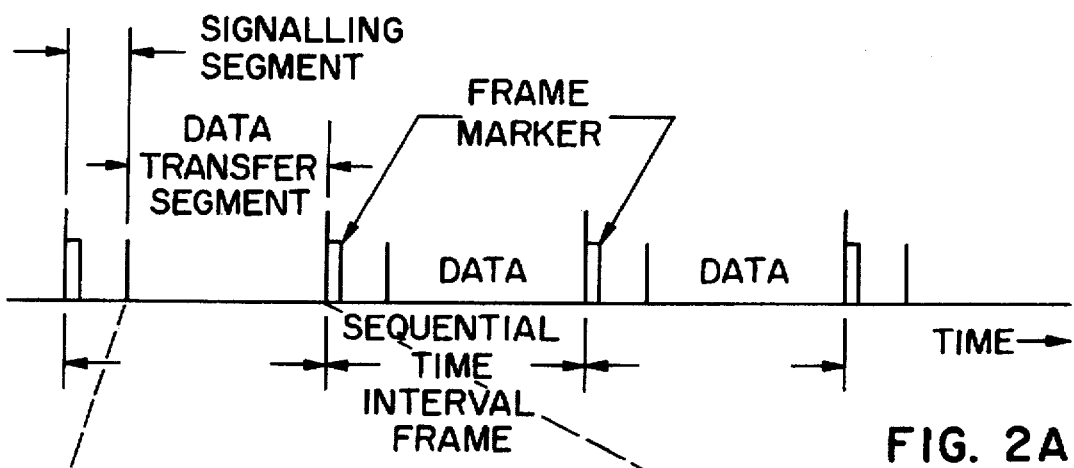
FIGS. 2A, 2B, 2C; and 2D illustrate signal timing arrangements in accordance with the method of the present invention.
Figure 2B:
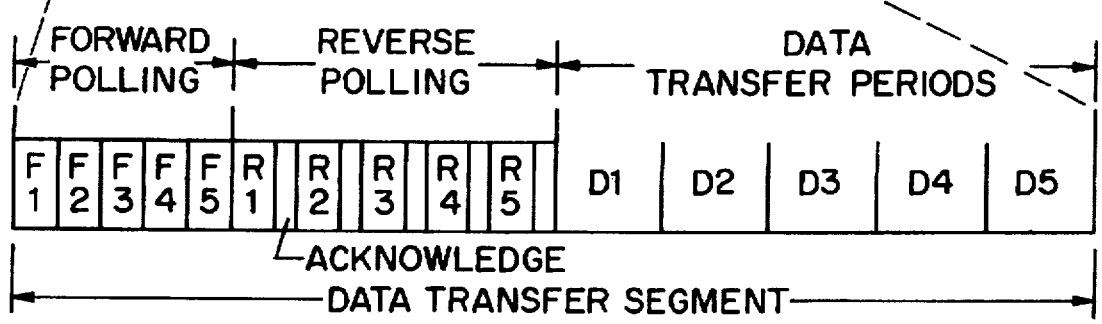

The method of the present invention relates primarily to the arrangements of signals within the data transfer segment of each time interval frame, and accordingly an exemplary data transfer segment for a particular channel is shown in greater detail in FIG. 2B.

The data transfer segment in accordance with a preferred embodiment of the invention is subdivided into a number of forward polling periods F1, F2, F3, etc. a number of reverse polling periods R1, R2, R3, etc. and a number of data transfer periods D1, D2, D3, etc. In the example illustrated in FIG. 2B there are five forward polling periods, five reverse polling periods and five data transfer periods, corresponding to accommodation of five active remote stations. Each active remote station is assigned to a signal channel and a forward polling period and a reverse polling period. Accordingly the number of forward and reverse polling periods must equal or exceed the number of active remote stations assigned to that channel. The number of data transfer periods can be less than the number of active remote stations, since in a packet transmission system not all remote stations need to transmit or receive a data packet during each time interval frame. Naturally a system may include a greater or lesser number of each type of period depending on the number of active remote stations to be accommodated in a particular channel and the data transfer requirements and capacities of the system. For higher data transfer rates, a larger number of users can be accommodated. Remote stations are assigned to a channel and particular polling periods by the base station, and such assignments are relayed to the remote stations during the signalling segment.

When the base station desires to send a data transmission to a remote station, it sends a polling signal during the corresponding forward polling period using the broadbeam antenna pattern. This polling signal is preferably a spread spectrum signal to provide increased resistance to interference, and includes data signals designating to the remote station which data transfer period will be used for the data transmission.

Figure 2C:
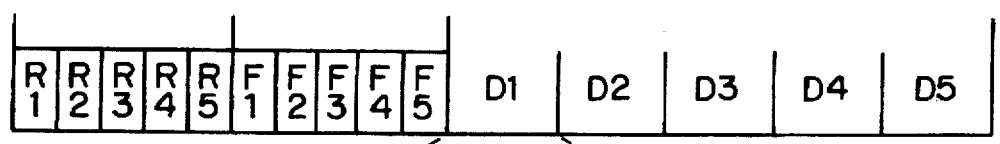
Figure 2D:
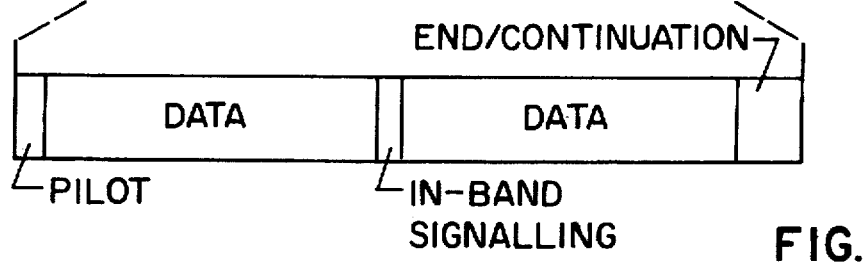

When the remote station receives the forward polling signal, it prepares to receive a data transfer signal during the data transfer period designated by the forward polling signal. An exemplary data transfer period is shown in an enlarged time format in FIG. 2D. During an initial pilot tone portion of the data transfer period the remote station transmits a pilot tone for use by the base station in determining the most advantageous antenna configuration for the radio link between the remote station and the base station. This configuration is determined by the adaptive characteristics of the base station antenna system responding to the received pilot tone. Using the information derived by the adaptive antenna system from the pilot tone signal, the antenna system is configured for transmission of the data transfer components of the signal as shown in FIG. 2D, with weighing of signal amplitude and phase at each element of the array antenna to replicate the optimum antenna configuration for the return signal to the remote station. The data transfer components may include in-band signalling components for control functions and an end or continuation-of-data message during the data transfer period. When data transfer cannot be completed during a single data transfer period, the continuation-of-data message may include a designation of a data transfer period in the same or a subsequent sequential time interval frame for transfer of continuing data.

When the remote station desires to send a data transmission to the base station it sends a polling signal during the corresponding reverse polling period which is received by the broad-beam antenna pattern of the base station. This reverse polling signal is also preferably a spread spectrum signal to provide interference resistance. In the case of the reverse polling signal, the base station preferably provides an acknowledgment signal, which may be sent during the reverse polling period to indicate to the remote station that the reverse poll has been received and including data to designate the data transfer period that will be cleared to receive a data transfer from the remote station. The remote station then sends a data transfer signal, starting with a pilot tone, during the designated data transfer period. The base station receives the pilot tone, and based thereon, configures its antenna system to receive data signals on an effective directional antenna pattern. As an alternate to the signals shown in FIG. 2B, it might be advantageous to provide the reverse polling period first and the forward polling period second as shown in FIG. 2C. In this event, the base station can acknowledge the receipt of the reverse polling signal from a remote station and designate a data transfer segment by a selected forward acknowledgment signal during the corresponding forward polling period. In the case of forward polling, as described above, an acknowledgment is not required, since the transmission of the pilot tone by the remote station at the start of the data transfer period constitutes sufficient knowledge to the base station that the remote station has received the forward polling signal.

When the remote station has received an acknowledgment of its reverse polling signal it initiates a data transfer as shown in FIG. 2D with a pilot tone first, to be used for antenna configuration by the base station, followed by data transfer signals and an end/continuation signal. As with the forward data transfer, in-band signalling may also be provided. However, the remote station cannot designate the data transfer period for a continuation data transfer, but must await the next sequential time interval to again send a reverse polling signal to the central station.

While there has been described what is believed to be the preferred embodiment of the invention, those skilled in the art will recognize that other and further modifications may be made thereto without departing from the spirit of the invention, and it is intended to claim all such changes and modifications as fall within the scope of the invention.

I claim:

1. A method of signalling from a base station to at least one of a plurality of remote stations, wherein said base station comprises an antenna system providing variable antenna patterns including at least one broadbeam pattern, comprising the steps of:

providing sequential time intervals, each of said time intervals including a data transfer segment, said data transfer segment having a selected number of forward polling periods and a number of data transfer periods;

transmitting from said base station on said broadbeam pattern at least one polling signal during a forward polling period corresponding to said at least one remote station to signal to said remote station that a data transfer for said remote station will be transmitted in a designated data transfer period;

transmitting a pilot tone signal from said one remote station to said base station during an initial pilot tone portion of said designated data transfer period;

receiving said pilot tone signal at said base station and configuring said antenna system for transmission using said pilot tone signal; and transmitting data signals from said base station using said configured antenna system during remaining portions of said designated data transfer period and receiving said data signals at said remote station.

2. A method of signalling as specified in claim 1 wherein said antenna system comprises a plurality of antenna elements and means for adaptively combining the signals received at said antenna elements, and wherein said configuring step comprises configuring said antenna system for transmission in accordance with data derived from said means for adaptively combining during said step of receiving said pilot tone signal.

3. A method of signalling as specified in claim 2 wherein in said step of transmitting at least one polling signal, said polling signal is transmitted in spread spectrum format.

4. A method of signalling from a selected one of a plurality of remote stations to a base station having an antenna system providing variable antenna configurations including a broadbeam pattern, comprising the steps of:

providing sequential time intervals, each of said time intervals including a data transfer segment, said data transfer segment having a selected number of reverse polling periods and a number of data transfer periods;

transmitting a polling signal from said remote station during a reverse polling period corresponding to said remote station to signal to said base station that said remote station requests a data transfer;

transmitting an acknowledgment signal from said base station and receiving said acknowlegement signal at said remote station, said acknowledgement signal designating a data transfer period;

transmitting a pilot tone signal from said remote station during an initial pilot tone portion of said designated data transfer period and transmitting data signals from said remote station during remaining portions of said designated data transfer period;

receiving said pilot tone signal at said base station and selecting a variable antenna configuration using said pilot tone signal; and receiving said data signals at said base station using said selected antenna configuration.

5. A method of signalling as specified in claim 4 wherein said antenna system comprises an adaptive antenna system having a plurality of antenna elements and means for combining signals received at said antenna elements, and wherein said step of configuring said antenna system comprises configuring said means for combining signals.

6. A method of signalling as specified in claim 5 wherein in said step of transmitting said polling signal, said polling signal is transmitted in spread spectrum format.

7. A method of signalling as specified in claim 4 wherein said acknowledgment signal is transmitted during said reverse polling period.

8. A method of signalling as specified in claim 4 wherein said data transfer segments includes a corresponding number of forward polling periods following said reverse polling periods, and wherein said acknowledgment signal is transmitted during one of said forward polling period.

9. A method of signalling between a base station and at least one of a plurality of remote stations, wherein said base station comprises an antenna system providing variable antenna configurations including at least one broadbeam pattern, comprising the steps of:

providing sequential time intervals, each of said time intervals including a data transfer segment, said data transfer segment having a selected number of forward polling periods, a corresponding number of reverse polling periods and a number of data transfer periods;

transmitting a forward polling signal from said base station on said broadbeam pattern during a forward polling period corresponding to a remote station to signal to said remote station that a data transfer for said remote station will be transmitted in a designated forward data transfer period;

transmitting a reverse polling signal from a remote station to said base station during a reverse polling period corresponding to said transmitting remote station to signal to said base station that said transmitting remote station requests to transmit a data transfer to said base station;

receiving said reverse polling signal on said broadbeam antenna pattern at said base station and transmitting an acknowledgement signal from said base station and receiving said acknowledgement signal at said transmitting remote station, said acknowledgement signal designating a reverse data transfer period;

transmitting a pilot tone signal from one of said remote stations to said base station during an initial pilot tone portion of a designated data transfer period in response to one of said forward polling signal and said acknowledgement signal;

receiving said pilot tone signal at said base station and selecting a variable antenna configuration using said pilot tone signal; and communicating data signals between said one of said remote stations and said base station using said selected antenna configuration during remaining portions of said designated data transfer period.

10. A method as specified in claim 9 wherein said acknowledgment signal is transmitted by said base station during said reverse polling period.

11. A method as specified in claim 9 wherein said forward polling period follows the corresponding reverse polling period in each data transfer segment and wherein said acknowledgment signal is transmitted during said forward polling period.

* * * * *

UNITED STATES PATENT AND TRADEMARK OFFICE
CERTIFICATE OF CORRECTION

PATENT NO.   :   5,697,066

DATED        :   December 9, 1997

INVENTOR(S)  :   Anthony Acampora

It is certified that error appears in the above-identified patent and that said Letters Patent is hereby corrected as shown below:

On title page, , Item [73], "The Trustees of Columbia University" should read -- The Trustees of Columbia University in the City of New York --.

Signed and Sealed this

Twenty-third Day of June, 1998

Attest:

BRUCE LEHMAN

*Attesting Officer*          *Commissioner of Patents and Trademarks*